United States Patent Office 2,815,369
Patented Dec. 3, 1957

2,815,369

INTERMEDIATES FOR THE PRODUCTION OF POLYMERS

Harold S. Holt, Wilmington, Del., assignor to E. I. du Pont de Nemours and Company, Wilmington, Del., a corporation of Delaware No Drawing. Application August 26, 1955, Serial No. 530,896

3 Claims. (Cl. 260—486)

This invention relates to novel organic compounds which are useful as intermediates for the production of various polymers and interpolymers. More particularly, this invention deals with novel esters of acrylic and methacrylic acids which contain in the molecule a polyethylene oxy chain of more than three $OCH_2CH_2$ units and which is etherified at the end by a lower alkyl group. Accordingly, the novel compounds of this invention may be expressed by the general formula

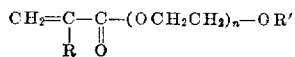

wherein R designates H or $CH_3$, R' is a lower alkyl radical (i. e. an alkyl radical of 1 to 6 C-atoms), while the subscript $n$ has a value not less than 4 and not greater than 20.

My novel compounds may be named generically lower alkoxy-polyethylene glycol esters of arcrylic and methacrylic acids. They may be prepared by reacting a lower-alkyl monoether of a polyethylene glycol of the formula $H(OCH_2CH_2)_n$—OR', wherein R' and $n$ have the same significance as above, with the acid chloride of acrylic or methacrylic acid. Or they may be prepared by reacting a monoalkyl ether of a polyethylene glycol as above defined with a lower alkyl acrylate or methacrylate. The latter reaction is often referred to in the art as ester-interchange, alcoholysis or transesterification. It is generally aided by ester-interchange catalysts such as a tetraalkyl titanate or metallic sodium.

A polymerization inhibitor is also preferably added, to prevent polymerization of the initial or final acrylates. Representative inhibitors are nitrobenzene, hydroquinone, 2,6-di-t-butyl-p-cresol and phenothiazine, and they may be used singly or in admixture, and in very small amounts, say about 0.1% to 0.2% by weight, based on the total charge.

The initial monoalkyl ethers themselves are generally obtained by a process of polymerization; that is, by reacting ethylene oxide gas with a lower monoalkyl ether of ethylene or diethylene glycol. The resulting reaction product therefore consists of a mixture of monoalkyl polyethylene glycols of the above formula with various integral values of $n$. The value of $n$, therefore, in the initial material and in the resulting acrylate esters is an average number, and may have integral as well as fractional values.

Some of the monoalkyl polyethylene glycols employed as initial materials in this invention occur in commerce. Thus methyl ethers of total molecular weights of 550 and 750, and designated, respectively, in commerce as methoxy polyethylene glycol "550" and methoxy polyethylene glycol "750," are available on the market. The average value of $n$ in these compounds is therefore approximately 12 and 16, respectively. Others can be readily synthesized by the method above indicated, and following the same system, they will be identified hereinbelow by their average molecular weight, such as "230" ($n=4.5$), "320" ($n=$about 6), etc.

The novel esters of this invention are generally clear, colorless liquids, having roughly the consistency of ethylene glycol. They are of great practical interest, because they lend themselves readily to polymerization (in the presence of ammonium persulfate or similar polymerization catalysts) to give polymers which are useful as flocculating agents, an antistatic agents or as surface-active agents in general.

They are also capable of interpolymerization with other olefine compounds to produce interpolymers of similar utility. A particularly interesting example of such product is the copolymer of my novel ester with beta-methacrylyl-oxyethyl trimethyl-ammonium methyl-sulfate, which is an antistatic agent for hydrophobic textile fiber characterized by good durability to washing and laundering.

Without limiting my invention, the following examples are given to illustrate my preferred mode of operation. Parts mentioned are by weight.

Example 1

A solution of 30 parts of methoxy polyethylene glycol "750" [approximate formula $CH_3O(CH_2CH_2O)_{16}H$] in 30 parts of benzene was heated to reflux, and water-containing distillate was removed. 4 parts of methyl methacrylate, 0.01 part of metallic sodium and 0.02 part of hydroquinone were then added. The function of the sodium was that of an ester-interchange catalyst; the object of the hydroquinone was to inhibit polymerization of the methacrylate. Heating at reflux was continued and as the ester-interchange proceeded, splitting out methanol, a binary distillate boiling at 58.3° C. was removed to a total of 4 parts. The reaction was then stopped, and the residual benzene was evaporated off. Monomeric methoxy polyethylene glycol methacrylate was obtained as a viscous liquid, soluble in water.

When a small amount of azo-di-isobutyronitrile was added to the above compound a gel of the polymeric methoxy polyethylene glycol methacrylate was obtained. Polymer was also obtained when the monomer was warmed on a steam bath, in water solution, with a very small amount of an ammonium persulfate-potassium bisulfite mixture.

Example 2

A solution of 175 g. of methoxy polyethylene glycol of mol. wt. 350 [approximate formula $CH_3O(CH_2CH_2O)_7H$], 100 g. of methyl methacrylate, 0.35 g. of hydroquinone, and 0.2 g. of sodium was heated at about 113 to 148° C. for 6½ hours, during which time mixtures of water and methanol, with some methyl methacrylate, were removed by distillation. Additional methyl methacrylate (25 g.) was added during the distillation period to replace losses. The resulting solution was purified by addition of 20 g. of an acid ion exchange resin followed by filtration. The latter step removed the sodium catalyst and yielded monomeric methoxy polyethylene glycol methacrylate.

When the product thus obtained was heated with 1% of ammonium persulfate, a polymer in the form of a gel was obtained. When larger amount of catalyst (2%) was employed, a viscous solution of polymer resulted.

Example 3

A solution of 10.5 g. (0.1 mole) of methacrylyl chloride in 75 ml. of anhydrous ether was slowly added to a solution of 22 g. (0.096 mole) of methoxy polyethylene glycol "230" and of 7.9 g. (0.1 mole) of pyridine in 100 ml. of anhydrous ether, at −10° C. The charge was then warmed to room temperature and allowed to stand overnight. The solution was filtered from the pyridine hydrochloride, and the ether was removed by distillation. The yield of crude ester was 24 g. (84% of theory, based on the polyethylene glycol reactant). It was a colorless, oily liquid, soluble in water, alcohol and dioxane.

Example 4

A solution was prepared containing 48.2 g. of methacrylyl chloride, 150 g. of methoxy polyethylene glycol of M. W. 320, 37.9 g. of pyridine and 400 ml. of ether. The charge was warmed to reflux for one hour. Approximately one-half of the ether was then distilled off and the mass was filtered to remove the pyridine hydrochloride. Distillation was then continued and finished under vacuum until all the ether was removed. The weight of the residual ester was 148 g. It resembled in physical and chemical qualities the product of Example 3.

Example 5

85 g. of the product marketed as methoxy polyethylene glycol "550," 86 g. of methyl acrylate and 50 mg. of p-tertiary butylcatechol were mixed together. The resulting solution was heated to boiling and 25 g. of methyl acrylate was distilled off, until the head temperature reached 79° C. 0.5 g. of tetraisopropyl titanate was then added to the system, and over the next 5 hours, 60 g. of a mixture of methyl acrylate and methyl alcohol were distilled off. An additional quantity of methyl acrylate was then removed until the pot temperature reached 130° C., at which point the ceric nitrate test for alcohol on the distillate indicated no more than a trace of methyl alcohol in the system. The charge was then cooled to 90° C., and residual methyl acrylate was removed under vacuum. 83.5 gms. of methoxy polyethylene glycol acrylate were obtained. The product had the same physical appearance and chemical properties as in Example 3.

Example 6

825 g. of methoxy polyethylene glycol "550," 825 g. of methyl methacrylate, 9.27 g. of nitrobenzene and 0.927 g. of 2,6-di(t-butyl)-p-cresol were heated with agitation under nitrogen to the boil, and methyl methacrylate and water were removed by distillation, until the head temperature reached 99.5° C. After cooling, 7.4 g. of tetraisopropyl titanate were added, and upon resuming heating the methyl alcohol-methyl methacrylate azeotrope which formed was removed. Another portion of tetraisopropyl titanate (1.8 g.) was added, and distillation was continued until the head temperature reached 99° C. At this point the distillation gave only a faint ceric nitrate test for alcohol and reaction was considered complete.

The charge was then cooled to 95° C., under nitrogen, and 37 ml. of distilled water were added with stirring. The mass was steam distilled to remove methyl methacrylate. After cooling the residual mass to room temperature, its weight was brought up to 1840 g. by adding distilled water. The content of methoxy polyethylene glycol methacrylate in the mass was found by bromine titration to be 48.5% by weight.

Example 7

A mixture of 750 g. of commercial, methoxy polyethylene glycol "750" and 775 g. of thiophene-free benzene was distilled until the weight of the residue mass reached 975 g. To the thus dried solution were added 500 g. of distilled methyl methacrylate containing 2.0 g. of nitrobenzene and 0.2 g. of phenothiazine. The mixture was stirred and heated to reflux. Benzene was removed until the column and still head were free of moisture. At this point 3.0 g. of tetraisopropyl titanate were added and the column was put on total reflux. Over the next 2½ hours 80 g. of benzene-methyl-alcohol azeotrope were collected. 1.0 g. of tetraisopropyl titanate was then added and distillation was continued for an additional hour, until a ceric nitrate test showed no alcohol in the distillate. The charge, weighing 1186 g., was then cooled to 40° C. under nitrogen. The excess benzene and methyl methacrylate were removed by distillation under reduced pressure, until the pot temperature reached 87° C. at a pressure of 0.2 mm. The residue, constituting methoxy polyethylene glycol methacrylate of the formula

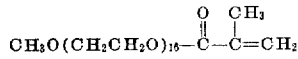

exhibited the same physical and chemical properties as the product of Example 3.

Example 8

Following the general procedure of Example 3, equivalent amounts of n-hexyloxy-decaethylene-glycol and methacrylyl chloride were reacted in ether solution, in the presence of enough pyridine to react with the HCl formed. The precipitated pyridine hydrochloride was filtered off, the ether evaporated and the monomer dispersed in water as a 30% emulsion. This monomer is soluble in water up to about 5%.

The initial n-hexyloxy-decaethylene-glycol was prepared by condensing hexyl alcohol and ethylene oxide in known manner, using a sodium catalyst.

Without any intended limitation, the following additional examples will show the manner in which my novel compounds may be polymerized by themselves or with other compounds to produce novel and useful polymers.

Example 9

A solution containing 5.76 g. of the monomeric methacrylate of methoxy polyethylene glycol (prepared according to Example 1) and 4.24 g. of water was warmed on a steam bath with two drops of cumene hydroperoxide as polymerization catalyst. The polymer thus obtained was an insoluble gel. A dispersion of the polymer, obtained by adding 60 g. of water and ball milling, flocculated clay particles suspended in water.

In lieu of cumene hydroperoxide in the above procedure, ammonium persulfate or any other conventional, free-radical, polymerization catalyst may be employed.

Example 10

A solution of 20 g. of the ester obtained in Example 3 above, in 19 g. of water and 3 g. of dioxane, was brought to pH 7 by the addition of approximately 1 g. of 30% sodium hydroxide solution. The charge was heated to 70° C. under nitrogen, and after 30 minutes the viscosity of the solution increased rapidly and gelation resulted. The mass was diluted with a mixture of 30 g. of dioxane and 10 g. of water. 20 mg. of α,α'-azo-bis-isobutyronitrile were added, and polymerization was continued at the same temperature for another one-half hour.

When "Dacron" polyester fabric was padded from a 4% active-ingredient solution of the above polymer and dried, it acquired an antistatic property of rating "excellent."

Example 11

16 g. of methoxy dodeca(ethyleneoxy) methacrylate (prepared as in Example 5 above) and 4 g. beta-methacrylyloxyethyl trimethyl-ammonium methyl-sulfate were dissolved in 80 g. of water. Ammonium persulfate initiator was added and the mass was heated 65° C. for about 4 hours. A gelled material was formed and this was dispersed in 300 cc. of water to a 5%-solids concentration.

This agent was applied to fabrics of nylon and found to be a good antistatic agent, whose effectiveness persisted through 10 laundering cycles.

When the above procedure was repeated, except using the initial monomers in equal weights, the product obtained when applied in the same manner to nylon, produced an antistatic effect which persisted through 25 laundering cycles.

Example 12

33 g. of 30% aqueous emulsion of n-hexyloxy-decaethyleneoxy methacrylate (of Example 8) were polymerized with 0.2 g. of ammonium persulfate in a nitrogen atmosphere. The polymerization cycle was about 1 hour at 65° C. in an oil bath and the polymer obtained was partially water soluble.

It will be understood that the details of the above examples may be varied widely within the skill of those engaged in this art.

I claim as my invention:

1. A compound of the general formula

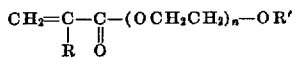

wherein R' designates an alkyl radical of 1 to 6 C-atoms, R stands for hydrogen or methyl, while the subscript $n$ has a value not less than 4 and not greater than 20.

2. A methoxy polyethylene glycol ester of acrylic acid of the formula

wherein $n$ has a value from 4 to 20.

3. A methoxy polyethylene glycol ester of methacrylic acid of the formula

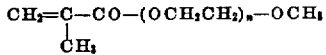

wherein $n$ has a value from 4 to 20.

References Cited in the file of this patent
UNITED STATES PATENTS

| | | |
|---|---|---|
| 1,951,782 | Bauer et al. | Mar. 20, 1934 |
| 2,129,694 | Izzard | Sept. 13, 1938 |
| 2,396,434 | Rehberg et al. | Mar. 12, 1946 |
| 2,602,079 | De Groote et al. | July 1, 1952 |
| 2,692,256 | Bauer et al. | Oct. 19, 1954 |

Disclaimer 2,815,369.—*Harold S. Holt*, Wilmington, Del. INTERMEDIATES FOR THE PRODUCTION OF POLYMERS. Patent dated Dec. 3, 1957. Disclaimer filed Oct. 30, 1962, by the inventor and the assignee, *E. I. du Pont de Nemours and Company*.

Hereby enter this disclaimer to claim 3 of said patent.
[*Official Gazette December 4, 1962.*]